United States Patent Office 3,509,197
Patented Apr. 28, 1970

1

3,509,197
FLUORO-CONTAINING CYCLOPROPANES
Ronald A. Mitsch, Falcon Heights, Minn., assignor to Minnesota Mining & Manufacturing Company, St. Paul, Minn., a corporation of Delaware
No Drawing. Continuation-in-part of application Ser. No. 307,728, Sept. 9, 1963. This application May 11, 1966, Ser. No. 550,878
Int. Cl. C07c 119/04
U.S. Cl. 260—453    16 Claims This application is a continuation-in-part of my co-pending application Ser. No. 307,728 filed Sept. 9, 1963, now abandoned.

This invention relates to cyclopropanes, and more particularly to fluorinated cyclopropanes containing functional substituents.

While cyclopropanes are known which are fluorinated and which are substituted by perfluoroalkyl groups, these compounds are of limited utility because they have little or no functional capability. Cyclopropanes which have functional substituents are known, but these have few or no fluorine substituents.

It is an object of this invention to produce fully fluorinated cyclopropane ring-containing compounds which contain substituent groups which confer functional capability on the compounds. Other objects of the invention will become apparent from the disclosures hereinafter made.

In accordance with the above and other objects of the invention, it has been found that certain cyclopropanes and their derivatives containing functional substituents are very useful, and can be produced by practical methods which provide these compounds in good yield.

The compounds of the invention are organic compounds containing from 3 to about 18 carbon atoms, and containing a cyclopropane ring which has from one to three functional substituents and is otherwise fully substitued by members of the class consisting of fluorine and perfluoroalkyl groups.

As used herein, the term "functional substituent" includes functional groups attached directly to the cyclopropane ring and functional groups attached to the cyclopropane ring through a linking radical. The linking radicals include arylene, alkylene, and alkarylene radicals, and fluorinated radicals (particularly perfluorinated radicals) corresponding thereto. These linking radicals may be straight or branched chain or can have cyclic structure. The carbon atoms contained therein may be linked together by oxygen atoms or nitrogen atoms. These linking radicals can also be substituted by halogens, such as chlorine, bromine and iodine; and they may link more than one functional group to the cyclopropane ring. A fluorine atom and a functional substituent may be attached to the same cyclopropane ring carbon atom. At the same time, more than one functional substituent which can be the same or different, can be attached to the same cyclopropane ring carbon atom.

Chemically reactive functional groups are comprehended within the scope of the invention. They are distinct from the relatively non-reactive functional atoms, such as chlorine and non-reactive groups, such as perfluoroalkyl groups. Such compounds which contain perfluoroalkyl groups are disclosed in U.S. Patent 3,228,864 (1966). This patent does not disclose functionally substituted perfluorocyclopropanes, however.

2

A wide variety of such chemically functional groups can be present in the compounds of the present invention. Typical illustrative functional groups are cyano, isocyanate, carboxyl, difluoramino, fluorimino, nitro, nitroso, sulfone, halosulfonyl, sulfonic acid, sulfamido, vinyl, allyl, ether, amido, anhydrido, carboxylate salt, ester, hydroxy, oximino and the like groups. The cyclopropane ring is maintained even though very reactive functional groups are present. Accordingly, the compounds of the invention can vary widely within the limits given above.

The compounds of the invention are produced by the reaction of a fluorinated olefin with a carbene. One useful group of carbenes is that derived from certain novel diazirines of the formula:

wherein the free valences are satisfied by co-valently bonded substituents, which can be perfluoroalkyl groups, chemically functional substituents or fluorine. Diazirines of this type are disclosed in applicant's co-pending application for U.S. Letters Patent Ser. No. 307,730, filed Sept. 9, 1963, which is a continuation-in-part of co-pending application Ser. No. 188,926, filed Apr. 16, 1962, now U.S. Patent No. 3,407,232. Other methods for production of carbenes are known, e.g., pyrolysis of salts of perhaloacetic acids, photolysis and/or pyrolysis of fluorodiazo compounds, such as $(CF_3)_2CN_2$ and

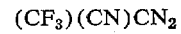

and the like.

In carrying out the reaction, the selected carbene precursor, preferably a fluorodiazirine or fluorodiazo compound, and olefin are mixed, in the presence of an inert solvent (free from Zerewitinoff-active hydrogen) if necessary or desirable, and subjected to photolysis and/or pyrolysis. As a first step, a carbene is formed from its precursor. This need not be isolated (although these intermediates can be identified if desired), but is allowed to remain in the reaction mixture which proceeds to the formation of the substituted cyclopropane. The reaction mixture can be subjected to photolysis, using UV light of wavelength 3000 to 4000 angstrom units, heating, if desired, to a temperature in the range of −50 to +250° C. Alternatively, pyrolysis alone, at temperatures in the range of about 50 to 200° C., is sufficient. The reaction mixtures are separated according to the physical properties of the products obtained, for example, as by gas-liquid chromatography if the products are gases at ordinary temperature, or by the usual fractional distillation or crystallization techniques where the products are liquids or solids.

The functional substituents can be introduced into the compounds of the invention as part of the starting olefin, or the carbene precursor. Similarly, both starting materials can contain functional substituents. Some functional substituents may require shielding, e.g., those which contain Zerewitinoff-active hydrogen. Such shielding procedures, as for example, conversion of acid groups to esters, are well known. Hydrolysis or other known procedures are used to regenerate the original functionality after the substituted cyclopropane compound is isolated from the reaction mixture, if desired.

The compounds of the invention are useful as such, e.g., as bleaches, oxidants in propellants, and the like, when the functional groups are oxidizing in nature, i.e. nitro or fluoramino groups.

The chemically functional groups retain these properties in the compounds of the invention, which, accordingly, are useful intermediates for the synthesis of chemical compounds. These compounds having two or three functional groups are useful crosslinking agents or co-monomers. Some of the monofunctional cyclopropanes, e.g. vinyl perfluorocyclopropyl carboxylate, can be polymerized to long chain termoplastic materials. Compounds of the invention can be used to modify the properties of polymers, or as cloth treatments, or as surfactants.

The following examples will more specifically illustrate the compounds of the invention and the processes for their preparation.

EXAMPLE 1

Cyanopentafluorocyclopropane

A sample of perfluoroacrylonitrile (2.14 g., $2 \times 10^{-2}$ moles) is condensed into a one liter glass storage bulb by vacuum transfer techniques. After degassing the material in the bulk at $-196°$ C., difluorodiazirine (0.156 g., $2 \times 10^{-3}$ moles) is condensed into the reactor. The stopcock is closed and the bulb and its contents are allowed to warm to 25° C. The mixture is irradiated at 25° C. with a 1000 watt ultraviolet lamp (General Electric BH–6) through a Corning No. 5840 filter. After 16 hours, the reaction mixture is separated by preparative vapor phase chromatography on a 2 meter, ½ inch Kel–F tetramer oil column at 26° C., and affords a 15% yield of cyanopentafluorocyclopropane. The product is identified by an absorption of medium intensity at 4.43 microns due to the presence of the cyano moiety and a medium-strong absorption peak at 6.7 microns, characteristic of the cyclopropane ring in the infrared spectrum and peaks at 147.3$\phi$ 153.6$\phi$ ($J_{AB}$ 189.2 c./s.) and 212.8$\phi$ in the fluorine nuclear magnetic resonance spectrum.

*Analysis.*—Calculated for $C_4F_5N$ (percent): C, 30.6; F, 60.5; mw., 157. Found (percent): C, 30.4; F, 59.5; mw., 158.

EXAMPLE 2

Cyanopentafluorocyclopropane

Perfluoroacrylonitrile (0.535 g., $5 \times 10^{-3}$ moles) and difluorodiazirine (0.078 g., $1 \times 10^{-3}$ moles) are condensed into a degassed, heavy-walled glass ampoule which is cooled to $-196°$ C. The ampoule is sealed and allowed to warm to 25° C. The ampoule and its contents are placed in a muffle furnace and slowly heated to 150–155° C. over a 24 hour period. The ampoule is then cooled to $-196°$ C., opened and the reaction mixture separated as outlined in Example 1. In this example, the yield of purified cyanopentafluorocyclopropane is 66.1% of the theoretical.

Cyanopentafluorocyclopropane can also be prepared in a 60% yield by heating cyanofluorodiazirine with excess tetrafluoroethylene at 95° C. for 1½ hours.

Cyanopentafluorocyclopropane undergoes reactions similar to other known fluorocarbon nitriles. It can be converted to pentafluorocyclopropane carboxylic acid with sulfuric acid.

The acid is readily transformed into esters with alcohols, amides with amines, salts with metal hydroxides or oxides, the anhydride with phosphorus pentoxide, and hydrogenated to the 1,1-dihydroalcohol.

EXAMPLE 3

Methoxypentafluorocyclopropane

Into a degassed, heavy-walled glass ampoule cooled to $-196°$ C. is added methoxytrifluoroethylene (1.12 g., $1 \times 10^{-2}$ moles) and difluorodiazirine (0.156 g., $2 \times 10^{-3}$ moles) by vacuum transfer techniques. After sealing, the ampoule is allowed to warm to room temperature and then heated at 150° C. for 18 hours. The reaction mixture is cooled to $-196°$ C., the ampoule is opened and the contents purified by vapor phase chromatography. A 71.6% yield of methoxypentafluorocyclopropane is obtained. The structure is confirmed by a medium absorption at 6.86 microns characteristic of the cyclopropane ring in the infrared spectrum and peaks at 155.9$\phi$, 158.6$\phi$ and 165.7$\phi$ in the nuclear magnetic resonance spectrum.

*Analysis.*—Calculated for $C_4F_5H_3O$ (percent): C, 29.6; F, 58.6; mw., 162. Found (percent): C, 29.5; F, 58.0; mw., 161.

Methoxypentafluorocyclopropane is also obtained in a 61.5% yield when fluoromethoxydiazirine is heated with excess tetrafluoroethylene at 90–95° C.

EXAMPLE 4

Difluoraminopentafluorocyclopropane

A mixture of difluoraminofluorodiazirine (1.10 g., $0.92 \times 10^{-3}$ moles) and dichlorodifluoromethane (0.048 g., $0.4 \times 10^{-3}$ moles) ies condensed into a degassed ten milliliter, heavy-walled glass ampoule cooled to $-196°$ C. Tetrafluoroethylene (0.50 g., $5 \times 10^{-3}$ moles) is then condensed into the reactor and the ampoule is sealed. A polymerization inhibitor such as hydroquinone can be added to prevent polymerization type side reactions. The mixture is then slowly heated to and maintained at 80° C. for 18 hours. After the pyrolysis period, the total mixture is subjected to vapor phase chromatographic separation at 0° C. The purified product, difluoraminopentafluorocyclopropane (36% yield) is identified by its characteristic mass spectrum, a medium absorption at 6.67 microns, characteristic of the cyclopropane ring, in the infrared spectrum, and peaks at $-34.3\phi$, 151.6$\phi$, 152.2$\phi$ and 204.9$\phi$ in the fluorine nuclear magnetic resonance spectrum.

*Analysis.*—Calculated for $C_3F_7N$ (percent): C, 19.7; F, 72.7. Found (percent): C, 19.4; F, 72.7.

EXAMPLE 5

Perfluorovinylcyclopropane

Following the procedure of Example 3, perfluorobutadiene (1.62 g., $1 \times 10^{-2}$ moles) and difluorodiazirine (0.078 g., $1 \times 10^{-3}$ moles) are condensed into a 10 milliliter, heavy-walled glass ampoule at liquid nitrogen temperature. The ampoule is sealed and then heated to and maintained at 160–170° C. for three hours. The reaction mixture is then analyzed and separated by vapor phase chromatography. A mixture of perfluorovinylcyclopropane and perfluorocyclopentene is obtained in a 77% yield. Perfluorovinylcyclopropane is identified by peaks characteristic of the vinyl group and the cyclopropane ring at 5.62 and 6.56 microns, respectively, in the infrared spectrum. The nuclear magnetic resonance spectrum shows peaks at 87.1$\emptyset$, 107.0$\emptyset$, 149.4$\emptyset$ and 200.2$\emptyset$.

*Analysis.*—Calculated for $C_5F_8$ (percent): C, 28.3; F, 71.7. Found (percent): C, 28.2; F, 71.7.

Perfluorovinylcyclopropane can be copolymerized with other olefinic monomers, i.e. those monomers which can be copolymerized with perfluoropropylene, and in a similar manner.

EXAMPLE 6

Perfluoroallylcyclopropane

Following the procedure of Example 5, perfluoro-1,4-pentadiene (2.12 g., $1 \times 10^{-2}$ moles) and difluorodiazirine (0.078 g., $1 \times 10^{-3}$ moles) are condensed into a 20 milliliter, heavy-walled glass ampoule at liquid nitrogen temperature. The ampoule is sealed and then heated to and maintained at 140° C. for 5 hours. The reaction mixture is then fractionated through $-30°$, $-58°$ and $-196°$ C.

traps. The −58° and −196° C. receivers are combined and separated by vapor phase chromatography. Pure perfluoroallylcyclopropane is isolated in a 34% yield.

*Analysis.*—Calculated for C₆F₁₀ (percent): C, 27.5; F, 72.5; mol. wt., 262. Found (percent): C, 27.7; F, 72.2; mol. wt., 258.

EXAMPLE 7

Perfluoro-1,3-dioxapent-4-enecyclopropane

Following the procedure of Example 5, perfluoro-3,5-dioxa-1,6-heptadiene (2.44 g., 1×10⁻² moles), prepared by the low temperature addition of CF₂(OF)₂ to 1,2-dichloro-1,2-difluoroethylene followed by dechlorination with zinc, and difluorodiazirine (0.078 g., 1×10⁻³ moles) are condensed into a 20 milliliter, heavy-walled glass ampoule cooled to −196° C. The ampoule is sealed and then heated to and maintained at 140° C. for 4 hours. The reaction mixture is then separated by fractional distillation-condensation. Vapor phase chromatography is used to isolate pure perfluoro-1,3-dioxapent-4-ene-cyclopropane $$(CF_2=CF-OCF_2O\overline{CF_2CF_2})$$

is isolated by vapor phase chromatography and identified by spectroscopic means.

Perfluoro-1,2-bis(difluoramino)ethyl cyclopropane reacts with dicyclopentadienyliron in xylene hexafluoride solvent to give perfluoro-1,2-bis(fluorimino)ethyl cyclopropane $$[FN=CFC(=NF)-\overline{CFCF_2CF_2}]$$

100° C. A low yield of perfluoro-1,2-bis(difluoramino) ethyl cyclopropane $$[NF_2CF_2CF(NF_2)-\overline{CFCF_2CF_2}]$$

EXAMPLE 8

Perfluoro-1,2-bis(difluoramino)ethyl cyclopropane

Perfluorovinylcyclopropane, prepared as described in Example 5, is reacted with excess tetrafluorohydrazine at 100° C. A low yield of perfluoro-1,2-bis(difluoramino) ethyl cyclopropane The structure is confirmed by infrared and F¹⁹ nuclear magnetic resonance spectroscopy.

TABLE I

| | Starting Materials | | Product ¹ cyclopropane | Method used and comments |
|---|---|---|---|---|
| Example: | Olefin | Diazirine | | |
| 9 | CF₂=CF=N | N≡CCFN₂ | 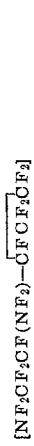 | Pyrolysis at 70–100° C. This dinitrile can be hydrolyzed to the dibasic acid from which fluorocarbon condensation polymers can be synthesized. |
| 10 | CF₂=CFOCH₃ | (N₂CFOCH₂)₂ | 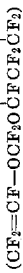 | Photolysis, at 50° C. |
| 11 | CF₂=CF−CF=CF₂ | O=C=N−CFN₂ | 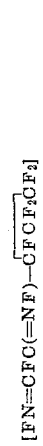 | Pyrolysis at 70–100° C. A diisocyanate useful for novel condensation polymers. |
| 12 | CF₂=CF−N=O | CH₃OCFN₂ | | Pyrolysis at 70–90° C. The −NO group can be oxidized to the −NO₂ group. |
| 13 | C₆H₅OCF=CFOC₆H₅ | CH₃OCFN₂ | | Pyrolysis at 95° C. |

TABLE I.—Continued

| | Starting Materials | | Product ¹ cyclopropane | Method used and comments |
|---|---|---|---|---|
| | Olefin | Diazirine | | |
| 14 | CF₂=CF—C₆H₅ | O=C=NCFN₂ | 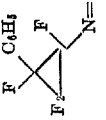 | Pyrolysis at 70–100° C. Reactions characteristic of the phenyl and isocyanato group can be carried out with this product. |
| 15 | CF₂=CFC(O)—OC₂H₅ | (C₄F₉)₂CN₂ | 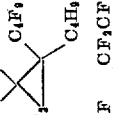 | Pyrolysis at 100° C. The ester is converted to the amide with ammonia. |
| 16 | CF₂=CFCF₂CF₂CO₂H | NF₂CFN₂ | 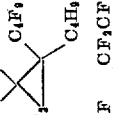 | Pyrolysis at 70–80° C. It is necessary to block acid group by ester formation before reaction. |
| 17 | CF₂=CF(CF₂)₆CF₃ | CH₃OCCH₂CH₂OCFN₂ | 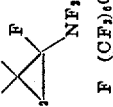 | Photolysis at 70° C. The ester is hydrolyzed with dilute ammonium hydroxide to form the ammonium salt which is useful as a surfactant. The ester group is reduced to the alcohol with lithium aluminum hydride. |
| 18 | CF₂=CF—C(O)OH | CH₃OCFN₂ | 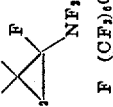 | Pyrolysis at 70–100° C. It is necessary to block acid group by ester formation before reaction. The acid is converted to the anhydride with phosphorus pentoxide. |
| 19 | CF₃CF=CF—C₆H₅ | N≡CCFN₂ | 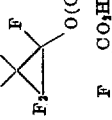 | Photolysis at 50° C. |
| 20 | C₆H₅CF=CFCF₃ | (CH₃)₂C=NOCFN₂ | 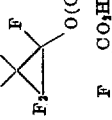 | Pyrolysis at 70–100° C. |
| 21 | 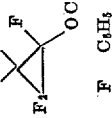 | CF₂N₂ | 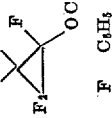 | Pyrolysis at 125° C. |
| 22 | CF₂=CFCF₂CFClCF₂CFCl₂ | N≡CCFN₂ | 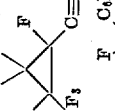 | Pyrolysis at 95° C. |

3,509,197

TABLE I.—Continued

| | Starting Materials | | Product 1 cyclopropane | Method used and comments |
|---|---|---|---|---|
| | Olefin | Diazirine | | |
| 23 | $CF_2=CF-CF_2C_6H_5$ | $CF_3SO_2CH_2CH_2CH_2OCFN_2$ |  | Pyrolysis at 50° C. |
| 24 | $(CF_3=CFCF_2CFClCF=)_2$ | $C_6F_{13}CFN_2$ | 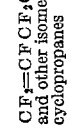 | Pyrolysis at 125-150° C. |
| 25 |  | $NF_2CFN_2$ | $CF_2=CFCF_2CF_2Cl$ and other isomeric cyclopropanes | Pyrolysis at 70-80° C. |
| 26 | $CF_2=CFOCF_2CF_2I$ | $N\equiv CCFN_2$ |  | Pyrolysis at 70-90° C. |
| 27 | $CF_2=CFSO_2F$ | $CF_2N_2$ |  | Pyrolysis at 125° C. The sulfonyl fluoride group can be converted to the $-SO_3H$, $-SO_3Cl$, $-SO_2NR_2$, and $-SO_3R$ groups by conventional means. |
| 28 | $CF_3=CF(CF_2)_3CF=CF_2$ | $NF_2CFN_2$ |  | Pyrolysis at 75° C. |
| 29 | $CF_2=CF-OCF_2CF-OCF_2CF_2I$ with $CF_3$ branch | $CH_3OCFN_2$ |  | Pyrolysis at 70-90° C. |
| 30 | $CF_2=CF-C_6H_5$ | $N\equiv CCFN_2$ |  | Do. |
| 31 | $CF_2=CF-C_6H_5$ | $CF_2N_2$ |  | Pyrolysis at 125° C. |

[1] The cyclopropane ring is designated by a triangle in the product column.

I claim:

1. An organic compound containing from 3 to 18 carbon atoms, containing a cyclopropane ring having from 1 to 3 functional substituents attached to ring carbon atoms, the carbon atoms in said ring being otherwise fully substituted by members of the class consisting of fluorine and perfluoroalkyl groups, each functional substituent containing a functional group selected from the class consisting of cyano, isocyanate, carboxyl, fluorimino, difluoramino, nitro, nitroso, sulfone, halosulfonyl, sulfonic acid, sulfamido, vinyl, ether, allyl, amido, anhydride carboxylate salt, ester, hydroxy and oximino.

2. A compound according to claim 1 which has 1 functional substituent attached to a ring carbon atom.

3. A compound according to claim 1 which has 2 functional substituents attached to ring carbon atoms.

4. A compound according to claim 1 which has 3 functional substituents attached to ring carbon atoms.

5. A compound according to claim 1 having a functional substituent which contains a fluoramino group.

6. A compound according to claim 1 having a functional substituent which contains a cyano group.

7. A compound according to claim 1 having a functional substituent which contains an ether group.

8. A compound according to claim 1 having a functional substituent which contains a carboxyl group.

9. A compound according to claim 1 having a functional substituent which contains an isocyanate group.

10. The compound cyanopentafluorocyclopropane according to claim 6.

11. The compound methoxypentafluorocyclopropane according to claim 7.

12. The compound difluoraminopentafluorocyclopropane according to claim 5.

13. The compound perfluorovinylcyclopropane according to claim 1.

14. The compound 1,2-dicyanotetrafluorocyclopropane according to claim 6.

15. The compound 1,6 - diisocyanatoperfluoro-3,4-bicyclopropyl according to claim 9.

16. The compound perfluoroallylcyclopropane according to claim 1.

References Cited

UNITED STATES PATENTS 3,006,727  10/1961  Ruh et al. _____ 260—648 X

OTHER REFERENCES

Mitsch, J.: Heterocyclic Chem., vol. 1, No. 5, December 1964, pp. 271 to 274.

LELAND A. SEBASTIAN, Primary Examiner

U.S. Cl. X.R.

149—88, 109; 204—158; 260—80, 464, 465, 468, 502.6, 503, 514, 551, 556, 560, 563, 566, 607, 611, 613, 617, 644, 647, 648, 650